(12) United States Patent
D'Aguanno

(10) Patent No.: US 6,250,168 B1
(45) Date of Patent: Jun. 26, 2001

(54) METHOD AND APPARATUS FOR LOCATING THE STRONGEST POINT ON A GOLF CLUB SHAFT

(76) Inventor: Frank D'Aguanno, 1833 Midfield Rd., Feasterville, PA (US) 19047

( * ) Notice: Subject to any disclaimer, the term of this patent is extended or adjusted under 35 U.S.C. 154(b) by 0 days.

(21) Appl. No.: 09/275,741

(22) Filed: Mar. 24, 1999

(51) Int. Cl.[7] .................................................. G01M 19/00
(52) U.S. Cl. ........................................ 73/865.3; 73/65.01
(58) Field of Search .................................. 73/788, 65.01, 73/460, 865.3, 865.8; 473/282, 287

(56) References Cited

U.S. PATENT DOCUMENTS

| | | | |
|---|---|---|---|
| 3,855,842 | * 12/1974 | Imabori et al. | ...................... 73/11.01 |
| 4,958,834 | 9/1990 | Colbert | ..................................... 273/77 |
| 5,870,815 | * 2/1999 | Karner et al. | ........................ 29/407.1 |
| 5,976,028 | * 11/1999 | Ciccarello et al. | ................... 473/289 |

OTHER PUBLICATIONS

Mitchell Golf Equipment Company–1998 Catalog.

* cited by examiner

Primary Examiner—Max Noori
(74) Attorney, Agent, or Firm—Charles N. Quinn

(57) ABSTRACT

A golf shaft spine locating apparatus is provided having a frame. A pair of vertical supports for the shaft are mounted to both ends of the frame. The shaft is placed on the supports and is rotated on the supports. A weight is applied to the shaft and exerts a downward force on the middle of the shaft between the supports while permitting rotary motion of the shaft on the supports. As the downward force is applied on the shaft and the shaft is rotated on the supports, the spine of the shaft is located.

5 Claims, 6 Drawing Sheets

METHOD AND APPARATUS FOR LOCATING THE STRONGEST POINT ON A GOLF CLUB SHAFT

FIELD OF THE INVENTION

The present invention relates to a golf shaft spine locating apparatus.

BACKGROUND OF THE INVENTION

There are numerous brands and models of golf shafts. In the highly competitive sport of golf, differences in the type of equipment one uses can affect how well one performs.

A spine is a seam or junction on the shaft that is created during the manufacturing process. The spine runs the length of the shaft and is the strongest point on the shaft. The spine affects the flex of each shaft. All shafts have spines. For instance, sheet-wrapped graphite shafts, made with overlapping pieces of graphite, contain an easily identifiable spine. Steel shafts, particularly those with a butt weld, also have spines. Even computer-controlled filament-wound graphite shafts and extruded seamless metal shafts have irregularities in the nature of spines created during manufacture.

The alignment of the spine in the clubhead affects the performance of each golf club. This alignment of spines in a set of golf clubs can affect how each golf club performs in relation to the others in the set. If the spines are not set in the clubheads at the proper angle in relation to the clubface, the user will not get the most out of their golf clubs. As a result, some golf clubs of one set will perform differently than others in the same set.

The generally accepted position is when the spine is located at three o'clock, or at the rear of the shaft with respect to the direction of club tread movement.

SUMMARY OF THE INVENTION

A golf shaft spine locating apparatus has a longitudinally elongated frame. A pair of supports for the shaft are upstanding from the frame and longitudinally spaced from one another. The shaft is placed on the supports and is rotatable on the supports. A weight is applied to the shaft for selectably exerting a force on the shaft at a position substantially mid-way between the supports while permitting rotary motion of the shaft on the supports. As force is applied on the shaft and the shaft is rotated on the supports, the spine of the shaft is located.

DETAILED DESCRIPTION OF THE PREFERRED EMBODIMENTS

Figure 1:
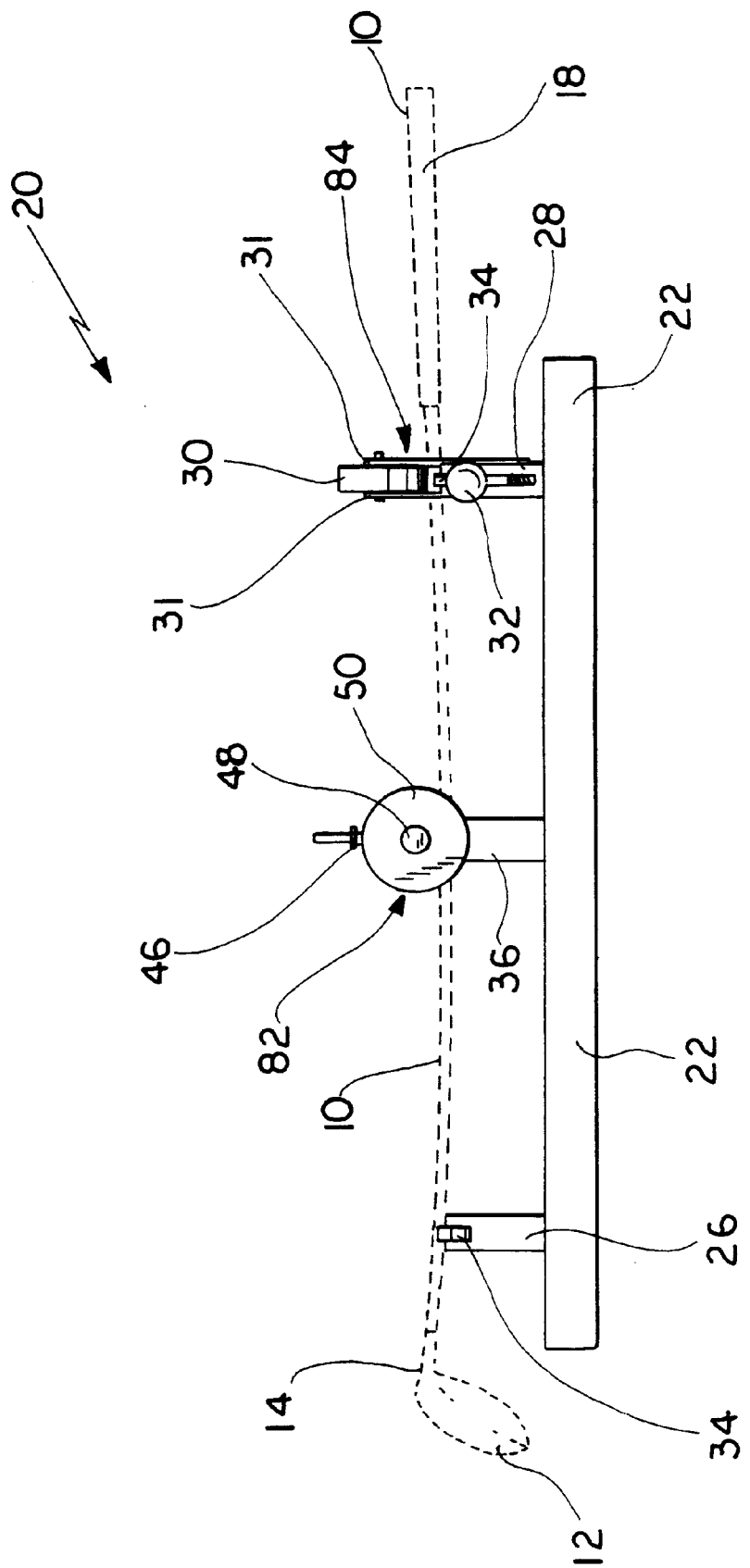
FIG. 1 is a front elevation view of a golf shaft spine locating apparatus of the present invention showing a golf club in a flexed position in the apparatus.

Referring now to FIG. 1, a golf shaft spine locating apparatus 20 is shown. The apparatus 20 has a base 22 on which left and right support posts 26, 28, a central weight assembly 82, and a golf shaft seating and rotating assembly 84 are mounted.

The apparatus 20 locates the spine 16 of a golf club shaft 10 so that the golf club shaft 10 can be positioned in the clubhead 12 in the proper position. The left and right support posts 26, 28 are mounted on the base 22 and support each end of the golf club shaft 10 in the apparatus 20. The central weight assembly 82 is mounted on the center of base 22 and applies a downward force to golf club shaft 10. The golf shaft seating and rotating assembly 84 is part of the right support post 28 and is utilized to seat and rotate the golf club shaft 10 in the left and right support posts 26, 28 as the central weight assembly 82 applies a downward force to the golf club shaft 10. As a downward force is applied on the golf club shaft 10 and the golf club shaft 10 is rotated on the left and right support posts 26, 28, the spine of the golf club shaft 10 is located.

Figure 2:
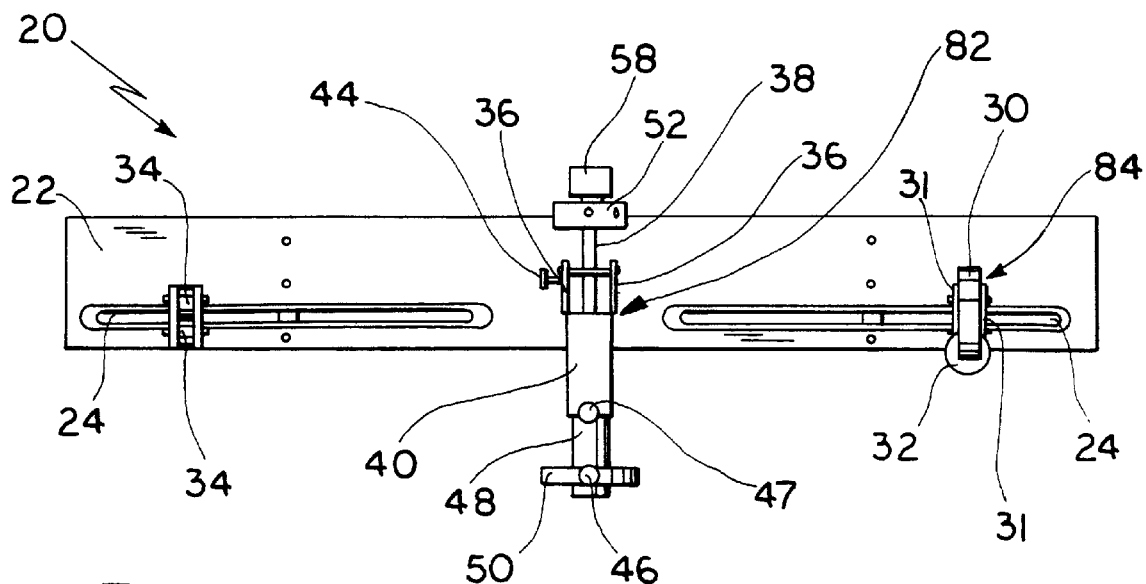
FIG. 2 is a top view of the apparatus of FIG. 1 but without the golf club.

Referring to FIGS. 1 and 2, the base 22 is rectangularly shaped with cutouts or slots 24 for mounting the left and right support posts 26, 28. The left and right support posts 26, 28 support the ends of golf club shaft 10. The left support post 26 supports the end of golf club shaft 10 connected to the clubhead 12. The right support post 28 supports the end of golf club 10 connected to the grip 18. Additionally, the right support post 28 is mounted to the golf shaft seating and rotating assembly 84 which is utilized to seat and rotate golf club shaft 10.

Figure 3:
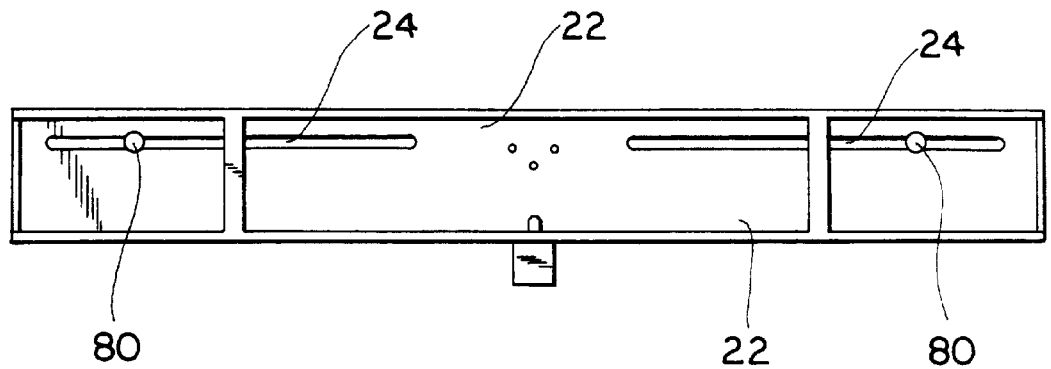
FIG. 3 is a bottom view of the apparatus of FIG. 1.
Figure 7:
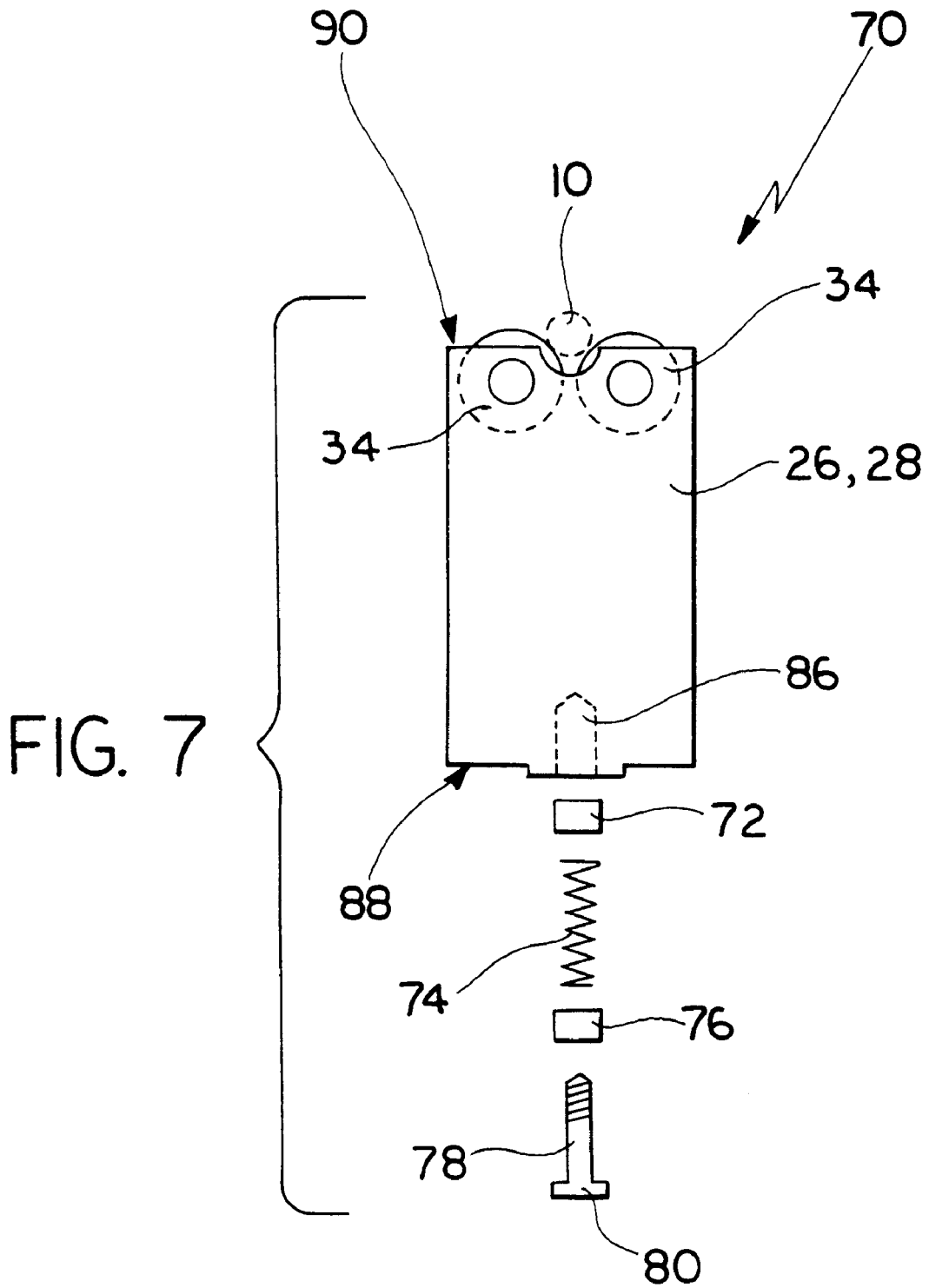
FIG. 7 is a side exploded view of a spring assembly for support posts.

Referring to FIGS. 3 and 7, the left and right support posts 26, 28 are spring mounted in the slots 24 of the base 22 with spring assemblies 70. Both the left and right support posts 26, 28 preferably utilize identical spring assemblies 70. As shown in FIG. 7, each spring assembly 70 includes a bolt 78, a spring 74, an upper cap 72 and a lower cap 76. The bolt 78 is inserted through the lower cap 76, the spring 74 and the upper cap 72. To mount the left and right support posts 26, 28 on to base 22, bolt 78 with the lower cap 76, the spring 74 and the upper cap 72 in place, is inserted from the bottom of the base 22 through the slot 24 and is threaded into an aperture 86 in bottoms 88 of left and right support posts 26, 28. The spring assembly 70 is then tightened by tightening head 80 of bolt 78 with a conventional Allen wrench.

Left and right support posts 26, 28 are longitudinally slidable within slots 24 for accommodating different shaft 10 lengths. To slide the left and right support posts 26, 28 within the slots 24, the spring assembly 70 is loosened by loosening the head 80 of the bolt 78 with a conventional Allen wrench. The left and right support posts 26, 28 are then longitudinally slidable within slots 24 of the base 22. After adjustment, the spring assembly 70 is tightened to hold left and right support posts 26, 28 in the desired positions.

Tops 90 of left and right support posts 26, 28 include roller bearings 34. The roller bearings 34 allow rotational motion of golf club shaft 10 in the left and right support posts 26, 28. The roller bearings 34 are standard roller bearings that are 0.005 inches apart.

Figure 8:
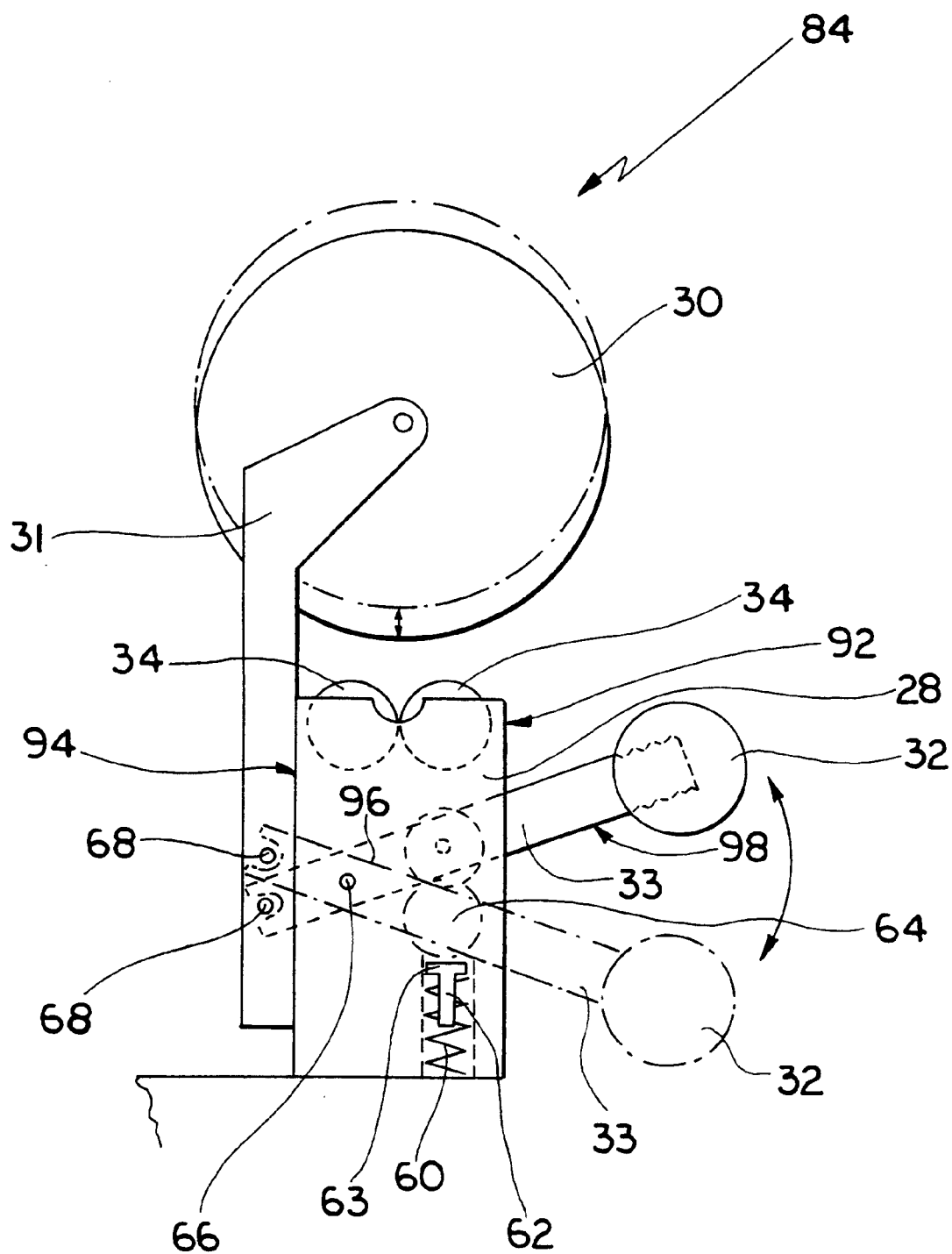
FIG. 8 is a left side elevation view of a golf shaft seating and rotating assembly of the apparatus of FIG. 1.
Figure 9:
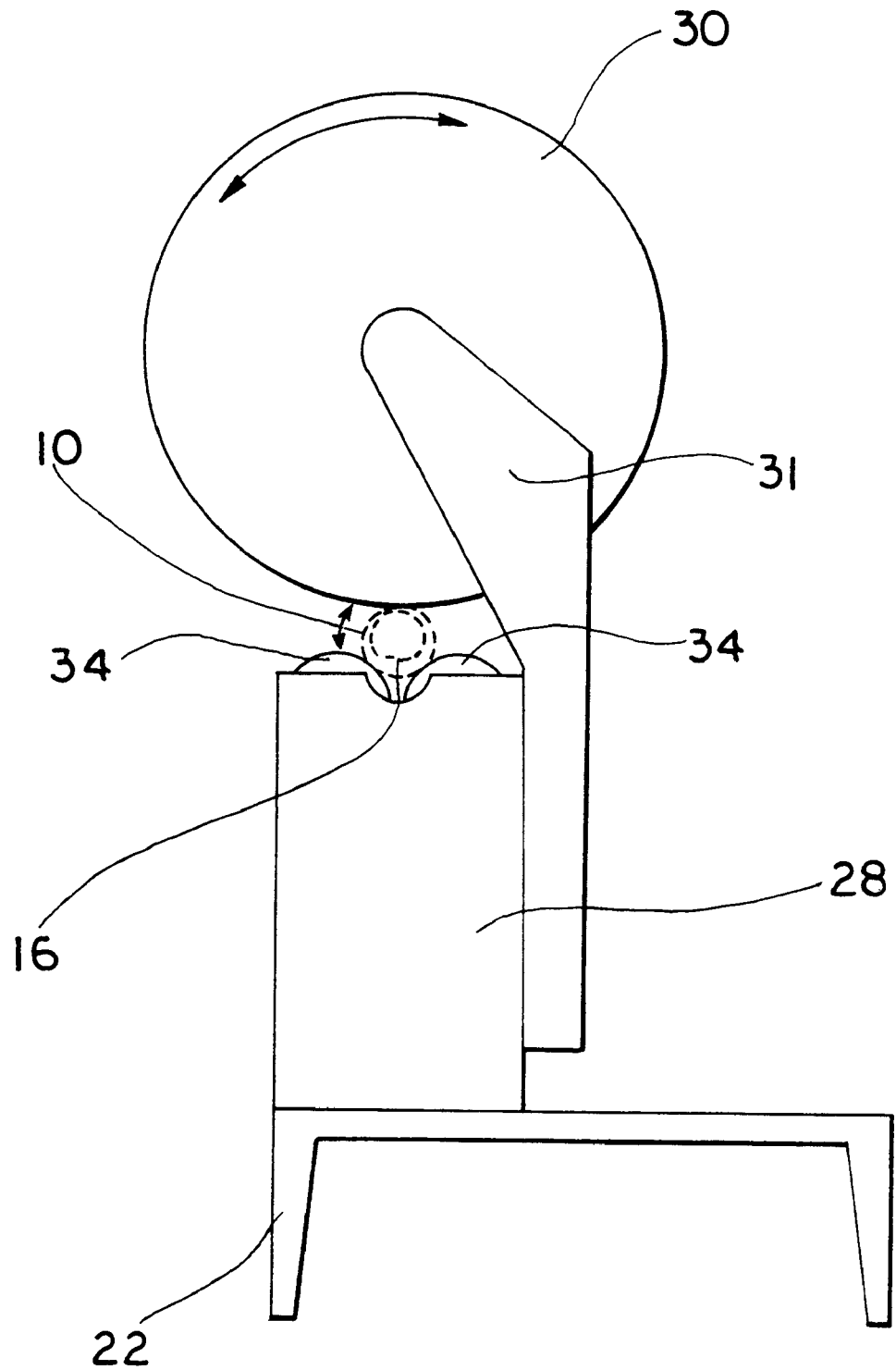
FIG. 9 is a right side elevation view of the golf shaft seated in roller bearings of a right support post of the apparatus of FIG. 1.

Referring to FIGS. 8 and 9, the golf shaft seating and rotating assembly 84 is utilized to seat and rotate the golf club shaft 10 in left and right support posts 26, 28 as the central weight assembly 82 applies a downward force to the golf club shaft 10. The seating and rotating assembly 84 is part of the right support post 28. The seating and rotating assembly 84 includes a wheel actuation handle 32, a wheel actuation shaft 33, a rubber wheel 30, and a wheel support 31.

As shown in FIG. 8, the rubber wheel 30 is rotatably attached to the wheel support 31. The wheel support 31 is attached to the right support post 28 and is vertically adjustable by pivotally rotating wheel actuation shaft 33 via wheel actuation handle 32 about a pivot pin 66. By vertically adjusting the wheel support 31, rubber wheel 30 is lowered into contact with the golf club shaft 10 or raised away from the golf club shaft 10. When the rubber wheel 30 is lowered into contact with the golf club shaft 10, the golf club shaft 10 can be rotated by rotating the rubber wheel 30.

A portion 96 of the wheel actuation shaft 33 passes through a front 92 of the right support post 28. Another portion 98 of the wheel actuation shaft 33 projects out from the front 92 of the right support post 28. The wheel actuation handle 32 is threaded on to the free end of portion 98 of the wheel actuation shaft 33.

The seating and rotating assembly 84 further includes a spring 60, a bolt 62, a roller 64, a pivot pin 66, and a reaction pin 68. Inside right support post 28, bolt 62 passes through the spring 60. Roller 64 is attached to the wheel actuation shaft 33. A head 63 of bolt 62 contacts roller 64. Pivot pin 66 is located in the wheel actuation shaft 33. Reaction pin 68 is located in wheel support 31 and engages portion 96 of the wheel actuation shaft 33.

As wheel actuation shaft 33 is rotated counterclockwise about the pivot 66 via wheel actuation handle 32, roller 64 releases pressure on head 63 of bolt 62 and spring 60 is decompressed. Wheel actuation shaft 33 pivots upward around pivot pin 66. Portion 96 of wheel actuation shaft 33 lowers reaction pin 68 which in turn lowers wheel support 31. As wheel support 31 lowers, rubber wheel 30 lowers into contact with golf club shaft 10.

As wheel actuation shaft 33 is rotated clockwise about the pivot pin 66 via wheel actuation handle 32, the roller 64 presses down on head 63 of bolt 62 and compresses spring 60. Wheel actuation shaft 33 pivots downward around pivot pin 66. Portion 96 of wheel actuation shaft 33 raises reaction pin 68 which in turn raises wheel support 31. As wheel support 31 lifts up, rubber wheel 30 will also lift up and away from golf club shaft 10.

Figure 5:
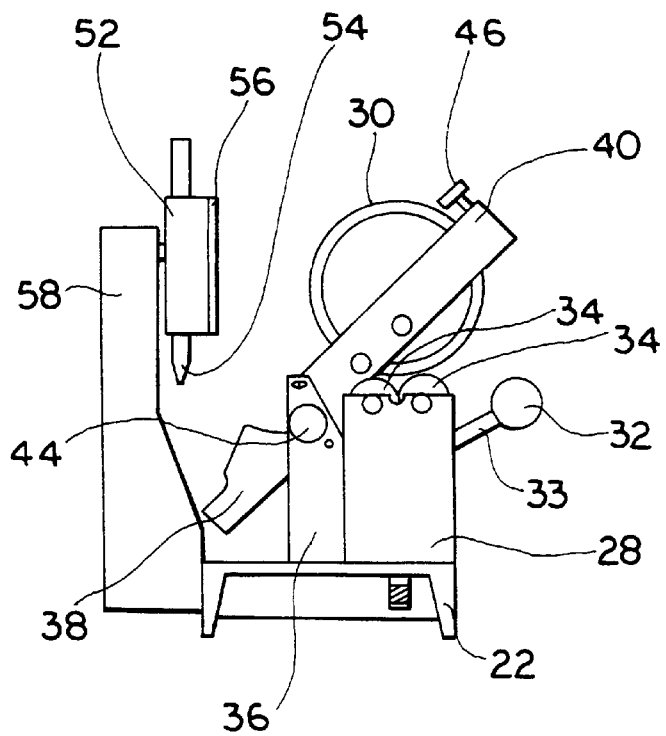
FIG. 5 is a left side elevation of the apparatus of FIG. 1 but with the pivoting arm in the raised position.
Figure 6:
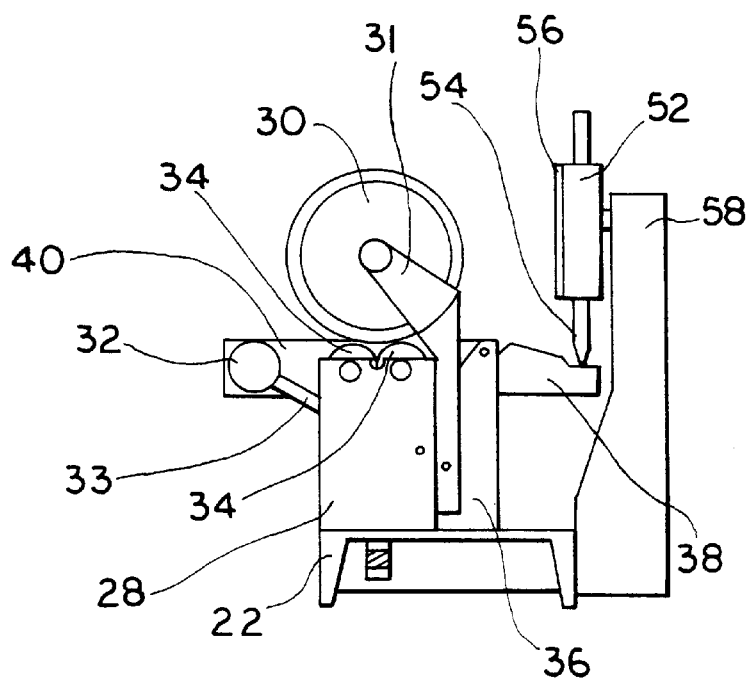
FIG. 6 is a right side elevation of the apparatus of FIG. 1 but with the pivoting arm in the horizontal lowered position.

Referring to FIGS. 2, 5 and 6 the central weight assembly 82 is mounted on the center of the base 22 and is utilized to apply a preferably downward force to golf club shaft 10. As a downward force is applied on golf club shaft 10 and golf club shaft 10 is rotated on left and right support posts 26, 28, the spine of golf club shaft 10 is located. The central weight assembly 82 includes a pivoting weight support 36, an upstanding arm 38, and an arm extension 40.

The upstanding weight support 36 is mounted on the center of the base 22. The pivoting arm 38 is pivotally rotatable within and about the upstanding weight support 36 by means of detent depressions 42 (not shown in the Figures) in the sides of the pivoting arm 38 within the upstanding weight support 36. A weight support set screw 44 threadably resides within the weight support 36 and engages detent depressions 42 of pivoting arm 38. The weight support set screw 44 can be tightened to hold pivoting arm 38 in the desired open or closed position. Pivoting arm 38 is shown in the open position in FIG. 5 and the closed position in FIG. 6.

Referring again to FIG. 2, arm extension 40 is part of pivoting arm 38. The free end of arm extension 40 contains a bore for receiving a weight extension shaft 48. An arm extension set screw 47 is located on the end of arm extension 40 for retaining weight extension shaft 48 in position. The weight extension shaft 48 is a solid cylinder and preferably comes in three different lengths of 2 inches, 4 inches and 6 inches for providing different downward forces.

Figure 4:
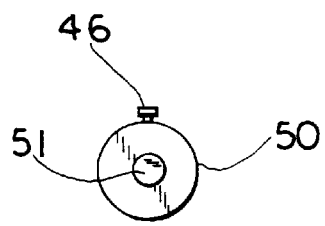
FIG. 4 is a front elevation view of a donut weight utilized with the apparatus of FIG. 1.

Donut weights 50 are attached to the free end of weight extension shaft 48 for providing downward force on the golf club shaft 10. As shown in FIG. 4, donut weights 50 have 3 inch outside diameters and 1 inch diameter bores 51 for receiving the free end of weight extension shaft 48. The donut weights 50 come in different sizes for providing different forces to different golf shafts 10. For example, the donut weights 50 have thicknesses of 0.5 inch, 1 inch or 1.5 inches. Set screws 46 for donut weights 50 located on the outside diameter of the donut weights 50 are tightened to retain donut weights 50 on weight extension shaft 48.

Referring to FIG. 2, a dial indicator support post 58 is mounted to base 22 and supports a dial indicator 52. The dial indicator 52 reads the amount of relative deflection of the golf club shaft when downward force is applied by the central weight assembly 82 to golf club shaft 10. As shown in FIGS. 5 and 6, the dial indicator 52 contains a adjustable bezel 56 for setting the dial indicator 52 to zero. Additionally, the dial indicator 52 contains a pointer stem 54 that is engaged by the pivoting arm 38 to indicate shaft deflection resulting from force applied to the golf club shaft 10 when the pivoting arm 38 is in the closed position shown in FIG. 6.

With the foregoing description in mind, the golf shaft spine locating apparatus operates as follows: The first step is to make sure pivoting arm 38 of the central weight assembly 82 is in the open position and does not contact pointer stem 54 of dial indicator 52 as shown in FIG. 5. Pivoting weight support set screw 44 engages detent depressions 42 in pivoting arm 38 to ensure pivoting arm 38 stays in the open position. At this point, golf club shaft 10 is not in apparatus 20.

The left and right support posts 26, 28 are then longitudinally adjusted within the slots 24 of base 22 to accommodate the length of golf club shaft 10 being spined. The spacing between the left and right support posts 26, 28 should be close to the maximum length of golf club shaft 10 between the bottom of the grip 18 and the top of the hosel 14.

As shown in FIG. 1, golf club shaft 10 is then placed in the apparatus 20. The club head 12 end of the golf club shaft 10 is rested on roller bearings 34 of left support post 26. The top end of golf club shaft 10 just below grip 18 is rested on roller bearings 34 of the right support post 28.

Next, the golf shaft seating and rotating assembly 84 of the top support post 28 engages the right end of the golf club shaft 10. As shown in FIG. 8, the wheel actuation handle 32 is rotated counterclockwise about the pivot pin 66 to lower rubber wheel 30 on to golf club shaft 10. The rubber wheel 30 seats golf club shaft 10 on the roller bearings 34 of the right support post 28 as shown in FIG. 9.

The pivoting arm 38 is then released from the open position shown in FIG. 5 and moved into the closed, or horizontal, position shown in FIG. 6. The pivoting arm 38 is locked in the closed or horizontal position by utilizing the weight support set screw 44 to engage detent depressions 42 in pivoting arm 38.

Once pivoting arm 38 is in the closed or horizontal position of FIG. 6, dial indicator 52 is set at the reference point or zero position. To set the dial indicator 52 at the zero position, the rotatable bezel 56 is rotated until the dial indicator 52 reads zero.

Next, the weight support set screw 44 which held the pivoting arm 38 in the closed or horizontal position is released. At this point, the force which had been applied to golf club shaft 10 is released and golf club shaft 10 releases and returns to its unstressed, unflexed position. Pivoting arm 38 is now located slightly above the horizontal.

Weight extension shaft 48 is inserted into the end of arm extension 40. The arm extension set screw 47 is tightened to hold the weight extension shaft 48 in place in the arm extension 40.

Next, donut weight 50 is applied to the weight extension shaft 48 until pivoting arm 38 moves back to the horizontal position and flexes golf club shaft 10. At this point, golf club shaft 10 is flexed and is free to flex, back and forth, as golf club shaft 10 is rotated via the rubber wheel 30. The horizontal position of the pivoting arm 38 is determined by the flexing of golf club shaft 10 in reaction to donut weight 50 in position on the end of weight extension shaft 48. (Previously, the horizontal position of the pivoting arm 38 was determined by the weight support set screw 44.)

Once again, the dial indicator 52 is set at the zero position. To set the dial indicator 52 at the zero position, the rotatable bezel 56 is rotated until the dial indicator 52 reads zero. This is the reference position of the golf club shaft 10 to determine the location of the spine 16.

The rubber wheel 30 is rotated by hand until a position of minimum deflection is indicated by pointer stem 54 on dial indicator 52. It is a very distinctive tactile sensation. The rubber wheel 30 is continuously rotated until golf club shaft 10 assumes a position of minimum deflection which is the position at which spine 16 is at the top dead center position of golf club shaft 10. Location of spine 16 is shown specifically in FIG. 9. Once spine 16 is located, a piece of masking tape is applied to golf club shaft 10 to mark the location of spine 16.

Golf club shaft 10 can then be removed from the apparatus 20 and golf club shaft 10 can be repositioned in club head 12 according to the desired placement of spine 16 to golf club shaft 10 relative to the hitting surface.

What is claimed is:

1. Apparatus for locating the strongest point on a tubular golf club shaft, comprising:
   a. a longitudinally elongated frame;
   b. a pair of supports for said tubular golf club shaft upstanding from said frame and longitudinally spaced one from another; and
   c. means connected to said tubular golf club shaft for selectably exerting downward force on the tubular golf club shaft residing rotatably on said supports at a position substantially mid-way between said supports while permitting rotary motion of said tubular golf club shaft on said supports.

2. The apparatus of claim 1 wherein said supports and said force exerting means each further comprise a pair of freely rotatable shaft contact wheels, each wheel of said pair being rotatable about a longitudinal axis, axes of rotation of respective wheels of a pair being parallel and at a common distance from said frame, peripheries of said wheels of a pair overlying one another.

3. The apparatus of claim 2 wherein said supports and said force exerting means each further comprise:
   a. a shaft contact wheel mounting block having longitudinal bores therethrough defining axes of rotation of said shaft contact wheels;
   b. respective shaft contact wheel axle shafts residing in respective ones of said bores;
   c. a pair of bearing assemblies each having inner and outer races mounting said shafts of contact wheels on said axle shafts;
   d. said inner races being connected to said axle shaft;
   e. said outer races being secured to said shaft contact wheels; and
   f. said mounting blocks being of generally U-shaped configuration with the bottom of the "U" lying in the longitudinal direction, said bores being through upstanding legs of said U, and said shaft support wheels residing between the legs of said U.

4. A method for locating the strongest point on a golf club shaft, comprising:
   a. supporting the shaft at two longitudinally separated locations and rotating the shaft as supported thereby; and
   b. contacting the shaft in a direction opposite that of the axis of the shaft with a downward force and a retractable gauge intermediate the locations during shaft rotation and detecting radial deviation of the shaft.

5. A method for locating the strongest point on a golf club shaft, comprising:
   a. supporting the shaft at two longitudinally separated locations;
   b. manually rotating the shaft at one of the two longitudinally separated locations;
   c. contacting the shaft transversely to the axis of the shaft at a pre-determined position substantially intermediate the separated locations with a consistent downward force; and
   d. detecting radial deviation of the contacted portion of the shaft during shaft rotation.

* * * * *